US008952992B2

(12) United States Patent
Maesaka

(10) Patent No.: US 8,952,992 B2
(45) Date of Patent: Feb. 10, 2015

(54) ZOOM PROCESSING DEVICE, ZOOM PROCESSING METHOD, AND COMPUTER PROGRAM

(75) Inventor: Hiroshi Maesaka, Tokyo (JP)

(73) Assignee: NEC Corporation, Tokyo (JP)

( * ) Notice: Subject to any disclaimer, the term of this patent is extended or adjusted under 35 U.S.C. 154(b) by 523 days.

(21) Appl. No.: 13/015,283

(22) Filed: Jan. 27, 2011

(65) Prior Publication Data

US 2012/0026198 A1 Feb. 2, 2012

(30) Foreign Application Priority Data

Feb. 5, 2010 (JP) .................................. 2010-024380

(51) Int. Cl.
*G09G 5/00* (2006.01)
*G06F 3/0481* (2013.01)

(52) U.S. Cl.
CPC .... *G06F 3/0481* (2013.01); *G06F 2203/04806* (2013.01)
USPC ........................................................ 345/660

(58) Field of Classification Search
None
See application file for complete search history.

(56) References Cited

U.S. PATENT DOCUMENTS

| 5,553,225 | A | * | 9/1996 | Perry ............................. 715/786 |
| 6,052,110 | A | * | 4/2000 | Sciammarella et al. ...... 345/661 |
| 6,575,571 | B2 | * | 6/2003 | Shibata .......................... 351/206 |
| 2002/0149605 | A1 | * | 10/2002 | Grossman ...................... 345/660 |
| 2005/0197763 | A1 | * | 9/2005 | Robbins et al. ............... 701/200 |
| 2008/0204476 | A1 | * | 8/2008 | Montague ...................... 345/661 |
| 2011/0128367 | A1 | * | 6/2011 | Yoshioka et al. ............... 348/79 |

FOREIGN PATENT DOCUMENTS

| JP | 6-295328 A | 10/1994 |
| JP | 2006-146643 A | 6/2006 |
| JP | 2006-164049 A | 6/2006 |
| JP | 2008-521067 A | 6/2008 |
| JP | 2008529153 A | 7/2008 |
| JP | 2008-197736 A | 8/2008 |
| JP | 2009-162820 A | 7/2009 |

OTHER PUBLICATIONS

Japanese Office Action for JP Application No. 2010-024380 mailed on Aug. 15, 2013 with English Translation.

* cited by examiner

*Primary Examiner* — Xiao Wu
*Assistant Examiner* — Yingchun He
(74) *Attorney, Agent, or Firm* — Sughrue Mion, PLLC

(57) ABSTRACT

Provided is a new framework to perform zoom processing of a screen displayed on a display by unit of a simple operation. A zoom processing device of this invention, includes: calculates a movement amount of a pointer which is selecting an object on the screen; and performs enlarged display of the screen including the object at a first magnification when, as a result of the calculation, the movement amount of the pointer is equal to or less than a threshold value, and performs reduced display of the screen including the object at a second magnification when, as a result of the calculation, the movement amount of the pointer is greater than a threshold value.

4 Claims, 6 Drawing Sheets

ZOOM PROCESSING DEVICE, ZOOM PROCESSING METHOD, AND COMPUTER PROGRAM

CROSS-REFERENCES

This application is based upon and claims the benefit of priority from Japanese patent application No. 2010-024380, filed on Feb. 5, 2010, the disclosure of which is incorporated herein in its entirety by reference.

TECHNICAL FIELD

This invention relates to technology for enlarged display or reduced display of a screen.

BACKGROUND ART

Heretofore, GUIs provided with rich operability have not been limited to personal computers, but have spread to portable telephones and other devices, and this has been accompanied by the widespread provision, in information processing terminals, of pointing devices (mice and similar) to control screen display scroll processing, zoom processing, and similar.

For example, in Patent Reference 1 below, technology is disclosed for executing scrolling or zooming in proportion to the distance moved by a pointing device with respect to the working display.

Patent Reference 1: Japanese Translation of PCT Application No. 2008-529153

SUMMARY

An exemplary object of the invention is to provide a zoom processing device, a zoom processing method and a computer program that can perform zoom processing of a screen displayed on a display by a simple operation.

A first zoom processing device according to an exemplary aspect of the present invention, includes: a pointer movement amount calculation unit for calculating a movement amount of a pointer which is selecting an object on a screen; and a zoom control unit for performing enlarged display of a screen including the object at a first magnification when, as a result of the calculation, the movement amount of the pointer is equal to or less than a threshold value, and for performing reduced display of a screen including the object at a second magnification when, as a result of the calculation, the movement amount of the pointer is greater than a threshold value.

A second zoom processing device according to an exemplary aspect of the present invention includes: a scrolling amount calculation unit for calculating a screen scrolling amount; and a zoom control unit for performing enlarged display of the screen at a third magnification when, as a result of the calculation, the scrolling amount is equal to or less than a threshold value, and for performing reduced display of the screen at a fourth magnification when, as a result of the calculation, the scrolling amount is greater than a threshold value.

A zoom processing method according to an exemplary aspect of the present invention, includes: calculating a movement amount of a pointer which is selecting an object on a screen; and performing enlarged display of a screen including the object at a first magnification when, as a result of the calculation, the movement amount of the pointer is equal to or less than a threshold value, and performing reduced display of a screen including the object at a second magnification when, as a result of the calculation, the movement amount of the pointer is greater than a threshold value.

A computer program according to an exemplary aspect of this invention is a computer program causing an information processing device to execute the above zoom processing method.

In this invention, "means" does not mean simply physical means, but also includes cases in which the functions of the means are realized by software. Further, the functions of one means or device may be realized by two or more physical means or devices, and the functions of two or more means or devices may be realized by one physical means or device.

EXEMPLARY EMBODIMENT

Figure 1:
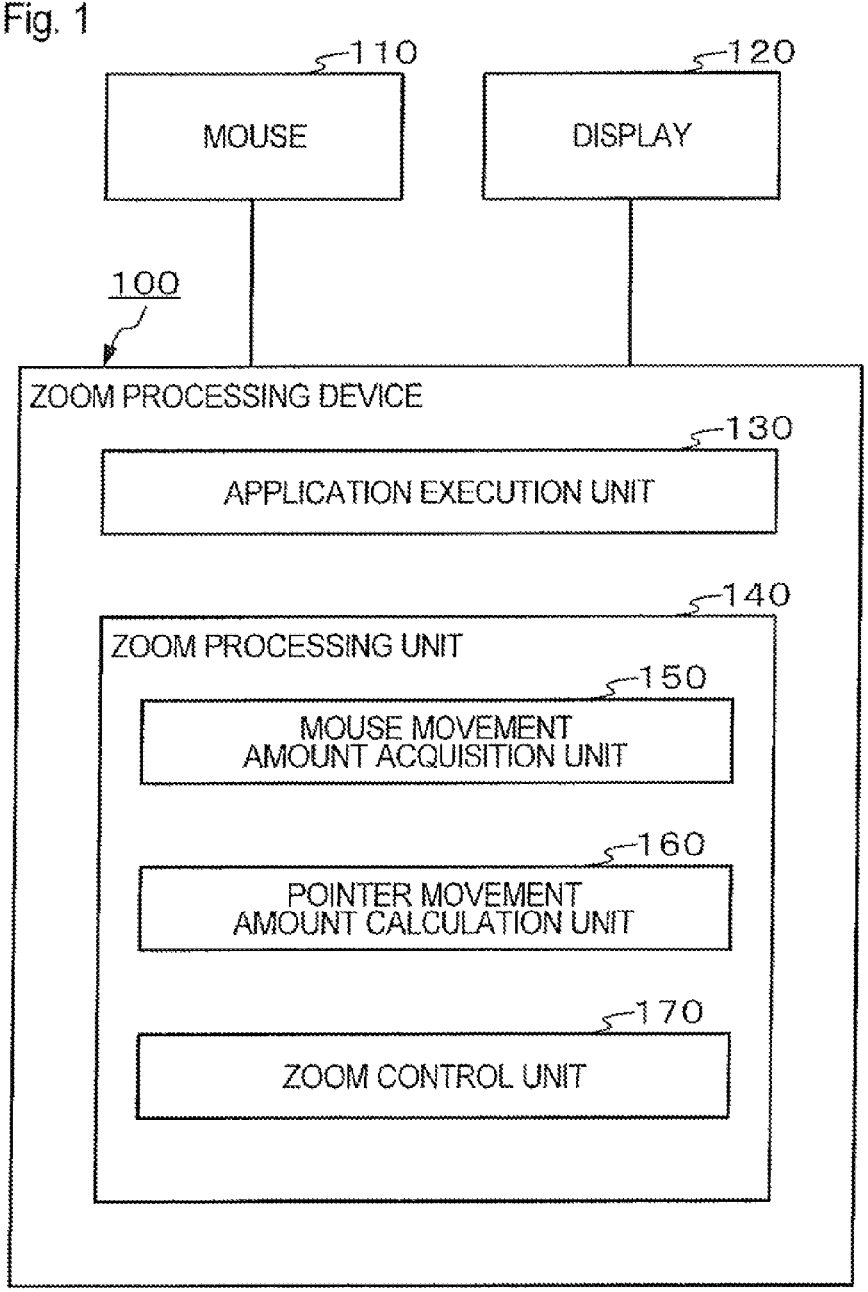
FIG. 1 shows the configuration of the zoom processing device of a first exemplary embodiment.

Below, a framework for enlarged display or reduced display of a screen on a display through operation of a pointing device is explained, referring to the drawings, as an exemplary embodiment of the invention.

FIG. 1 shows the configuration of the zoom processing device 100 of a first exemplary embodiment.

The zoom processing device 100 is configured using an ordinary personal computer comprising a hard disk (HDD), RAM, ROM, CPU, and communication device; a mouse 110 as a pointing device, and a display 120 are connected.

Also comprised are an application execution unit 130, in which is functionally realized a prescribed application program, stored for example on the HDD, by reading to RAM and execution by the CPU, as well as a zoom processing unit 140 in which is functionally realized a prescribed computer program stored on the HDD to realize the characteristic functions of this invention by reading into RAM and executing by the CPU. As the application program, an arbitrary application program can be used, such as an Internet browser, document creation software, spreadsheet software, presentation slide creation software, image editing software, map information display software, and similar.

The zoom processing unit 140 of the zoom processing device 100 performs reduction or enlargement of a screen displayed on the display 120 as the result of computations by the application execution unit 130, based on operation of the mouse 110 by the user. Further, the zoom processing unit 140 comprises, as functional means to realize this function, mouse movement amount acquisition unit 150, pointer movement amount calculation unit 160, and zoom control unit 170. Below, each of these function unit is explained.

The application execution unit 130 realizes the functions of the application program being executed, and displays computation results on the display 120.

The mouse movement amount acquisition unit 150 acquires from the mouse 110 information indicating the movement amount of the mouse 110, as well as information indicating whether a button included in the mouse 110 is being clicked, and similar. As information indicating the movement amount of the mouse 110, for example information indicating the movement amount in the horizontal direction (X direction) and the movement amount in the vertical direction (Y direction), taking for example as reference a prescribed direction.

The pointer movement amount calculation unit 160 calculates the movement amount of the pointer selecting the object on the screen displayed on the display 120 based on the movement amount of the mouse 110. More specifically, based on the movement amount of the mouse 110, the distance (|T−S|) between a first coordinate S and second coordinate T of the pointer is determined as the movement amount per unit time (unit movement amount) of the pointer selecting the object. As the units of the unit movement amount, mm, pt, inches, or another arbitrary length unit which can be processed by a computer, can be used. An object is an arbitrary object which exists on a screen displayed on a display 120 by the application execution unit 130, and which can be selected and moved ("dragged") according to an operation of the mouse 110. For example, a background image, graphic, text box, scrollbar, or scroll button, or similar can be an object.

The zoom control unit 170 performs enlarged display or reduced display, at a prescribed magnification, of the screen including the object displayed on the display 120, based on whether the pointer movement amount determined by the pointer movement amount calculation unit 160 is greater than a threshold value. More specifically, when as a result of calculation of the unit movement amount by the pointer movement amount calculation unit 160, the unit movement amount is equal to or less than a prescribed threshold value, enlarged display of the screen including the object at a first magnification "$\alpha^m$" (where $\alpha>1$ and m is a positive integer) is performed, and when the pointer unit movement amount is greater than a prescribed threshold value, reduced display of the screen including the object at a second magnification "$\beta^n$" (where $1>\beta>0$ and n is a positive integer) is performed.

Further, when the unit movement amount is equal to or below a threshold value from the time of new calculation of a pointer unit movement amount to the time of the immediately preceding calculation by the pointer movement amount calculation unit 160 (consecutive unit times (2dt)), the zoom control unit 170 updates the first magnification to a higher magnification, and performs enlarged display at the updated first magnification of the screen including the object being selected by the pointer.

On the other hand, when the unit movement amount is greater than a threshold value from the time of new calculation of a pointer unit movement amount to the time of the immediately preceding calculation by the pointer movement amount calculation unit 160 (at each of the consecutive unit times (2dt)), the second magnification is updated to a lower magnification, and reduced display is performed at the updated second magnification of the screen including the object being selected by the pointer. The method of updating the magnification of enlargement or reduction is explained below referring to FIG. 2.

Figure 2:
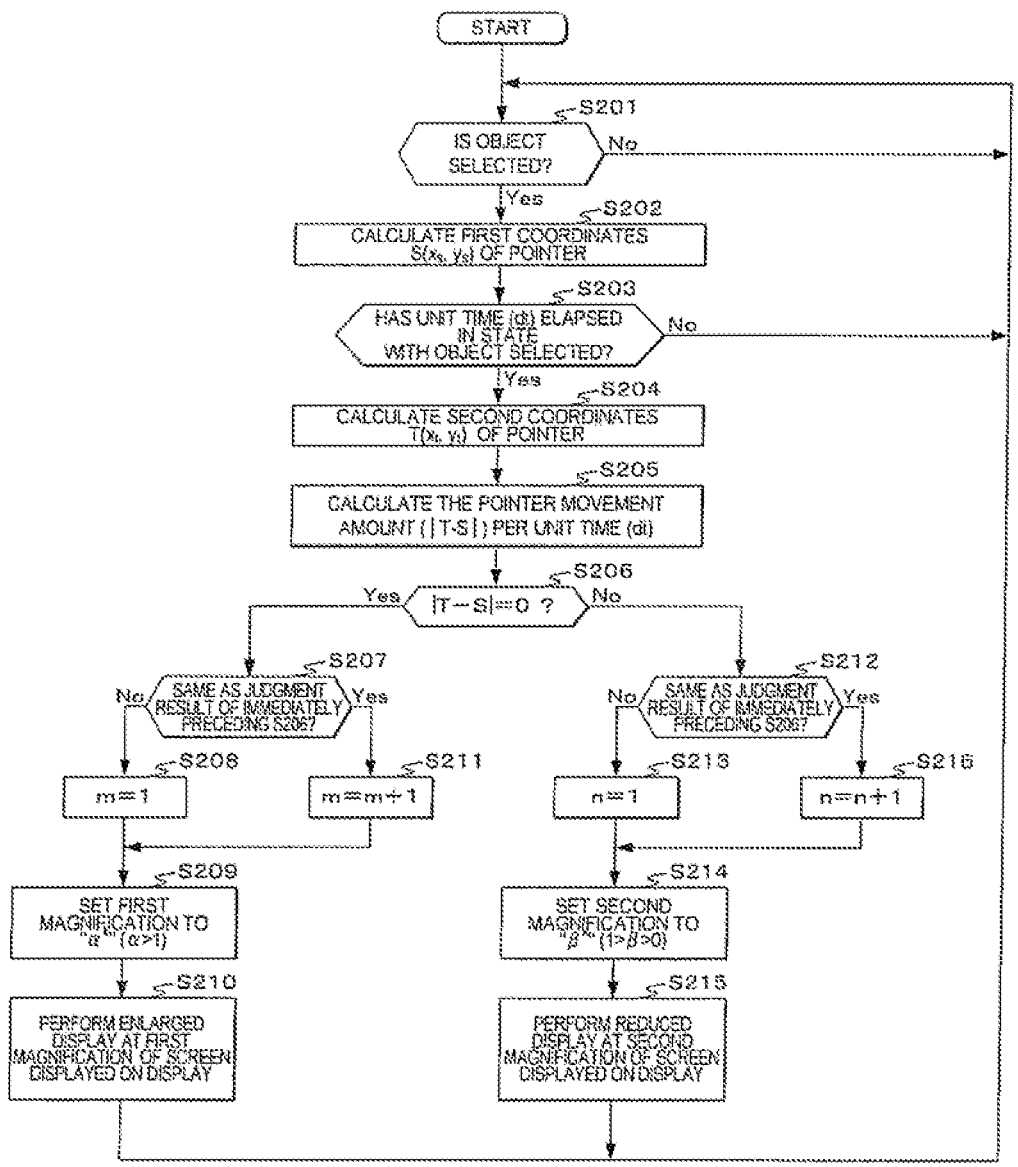
FIG. 2 is a flowchart of zoom processing by a zoom processing device.

FIG. 2 is a flowchart showing the flow of zoom processing by the zoom processing device 100. Below, details of this processing are explained referring to FIG. 2 and similar. In this Specification, the processes described in this flowchart and similar (including partial processes not assigned a symbol) can be changed in order arbitrarily, or executed in parallel, so long as no contradiction arises in the processing details.

Figure 3:
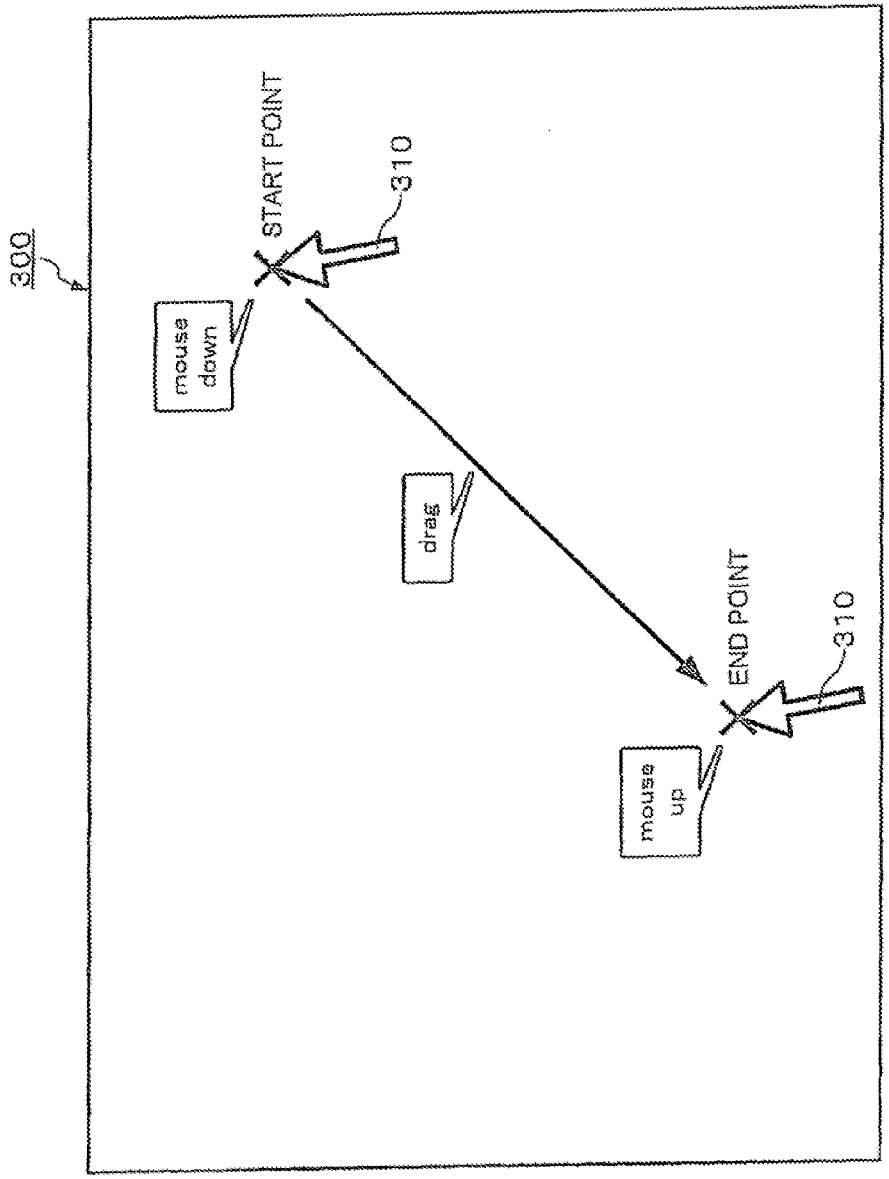
FIG. 3 shows a state in which a pointer moves on a screen with an object selected.

In the first exemplary embodiment, as shown in FIG. 3, a case is supposed in which the user operates the mouse 110 on an image editing screen 300 displayed on the display 120 by the application execution unit 130, in a state in which some object (not shown) is selected by the pointer 310, to move (drag) from a starting point S to an end point T. Dragging is taken to include not only cases in which the pointer 310 is moved in a state in which some object is selected, but also cases in which the pointer 310 is stopped in a state in which some object is selected. Further, it is supposed that the threshold value for the unit movement amount of the pointer 310 which is used as a judgment criterion by the zoom control unit 170 for whether to perform enlarged display or reduced display of the image editing screen 300 is set to 0. That is, in the first exemplary embodiment, whether the pointer 310 has been moved in a unit of time (dt) is taken to be a criterion for selecting either enlarged display or reduced display. The threshold value for the unit movement amount of the pointer 310 may be set to a value larger than 0.

Figure 4:
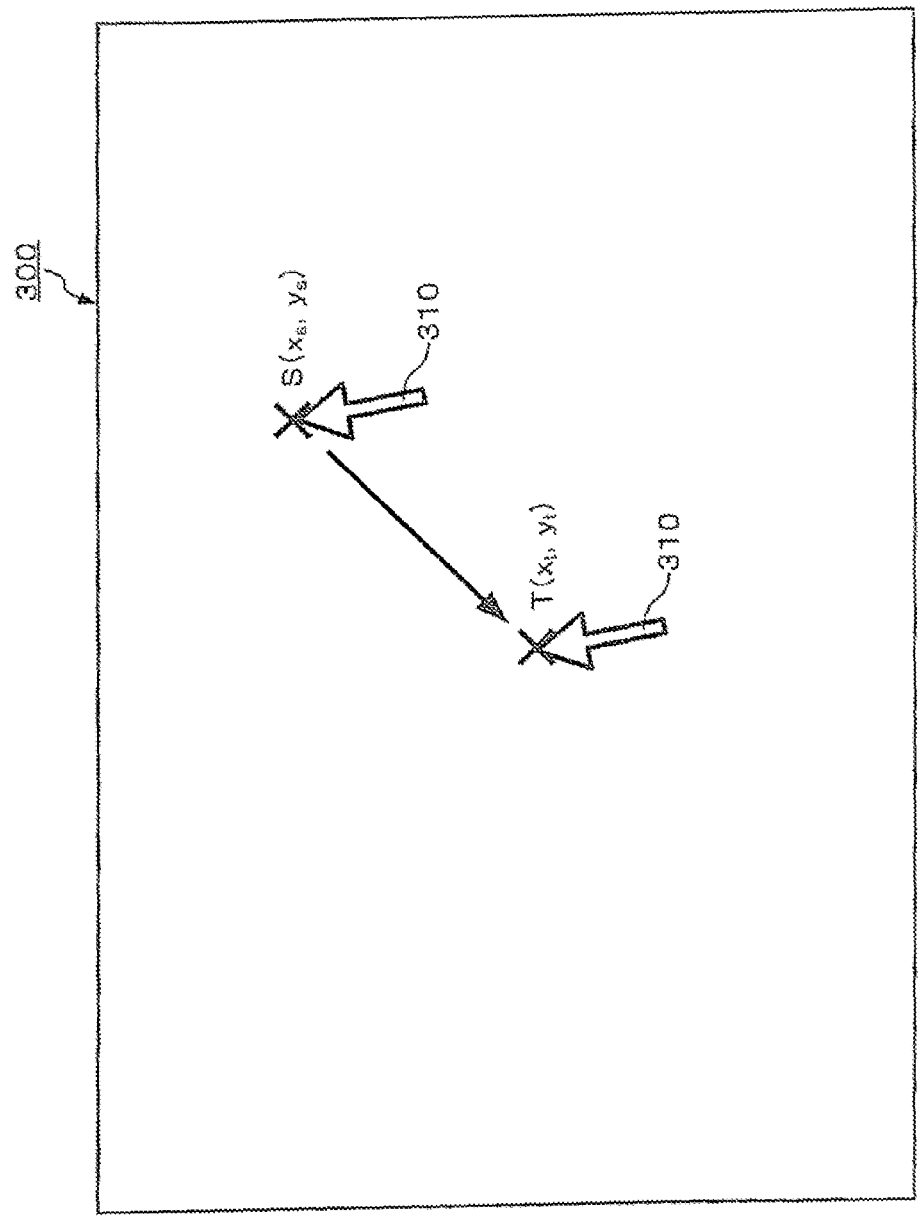
FIG. 4 shows a state in which, over a unit time (dt), a pointer moves on a screen with an object selected.
Figure 5:
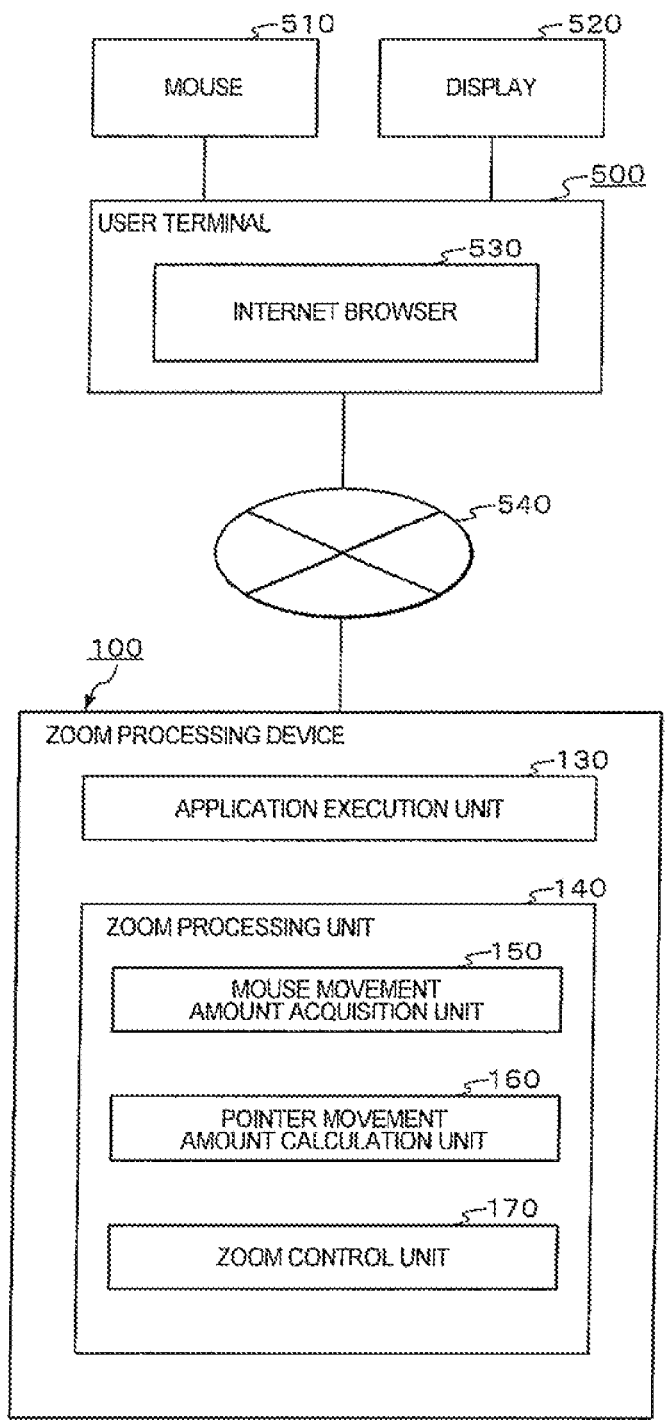
FIG. 5 shows an example in which a zoom processing device is used as an application server.

First, with the condition that the pointer 310 is selecting an object (when the judgment in S201 is Yes), the mouse movement amount acquisition unit 150 of the zoom processing device 100 calculates the first coordinates S ($x_s$, $y_s$) of the pointer 310, as shown in FIG. 4, based on information acquired from the mouse 110 (S202). In cases in which the pointer 310 is not selecting an object (when the judgment in S201 is No), processing waits until selection of an object by the pointer 310 begins.

And, with the condition that unit time (dt) has elapsed in the state in which the pointer 310 selects the object (when the judgment in S203 is Yes), the second coordinates T ($x_t$, $y_t$) of the pointer 310 are calculated, as shown in FIG. 4, based on information acquired from the mouse 110 (S204). In the first exemplary embodiment, the unit time (dt) is for example 1 second. In a case in which after the unit time (dt) has elapsed, selection of the object by the pointer 310 has been canceled (when the judgment in S203 is No), processing returns to S201.

Next, the pointer movement amount calculation unit 160 of the zoom processing device 100 calculates the unit movement amount (|T−S|) of the pointer 310, that is, the movement amount (|T−S|) of the pointer 310 for every unit time (dt) (S205).

Specifically, the unit movement amount (|T−S|) is the distance between the first coordinates S ($x_s$, $y_s$) and the second coordinates T ($x_t$, $y_t$) of the pointer calculated by the mouse movement amount acquisition unit 150, and so can be calculated from $|T-S|=((x_t-x_s)^2+(y_t-y_s)^2)^{1/2}$.

And, the zoom control unit 170 judges whether the pointer movement amount determined in S205 (unit movement amount of the pointer 310) is equal to or less than the threshold value (whether the amount is 0), that is, whether, over the unit time (dt), the pointer 310 selecting the object has been stopped (S206).

When in this judgment the unit movement amount of the pointer 310 is 0, that is, the pointer 310 selecting the object is stopped over the unit time (dt) (when the judgment is S206 is Yes), the zoom control unit 170 of the zoom processing device 100 further judges whether the judgment result in the immediately preceding S206 and the judgment result in the current S206 are the same, that is, whether the unit movement amount determined immediately before and the newly determined unit movement amount are both equal to or less than the threshold value (here, whether they are equal to 0) (S207).

When this judgment is No, the zoom control unit 170 sets (initializes) the value of the prescribed coefficient "m" to 1 (S208), sets (updates) the first magnification used for enlarging the screen to "$\alpha^m$" ($\alpha>1$) (S209), and performs enlarged display (zoom-in) at this updated first magnification "$\alpha$" of the image editing screen 300 including the object selected by the pointer 310 such that, for example, the pointer 310 is positioned in the center of the image editing screen 300 (S210). α may for example be set to a numerical value between 1.0 and 2.0.

On the other hand, when this judgment is Yes, the zoom control unit 170 increments the value of the prescribed coefficient "m" by 1 (S211), and sets (updates) the first magnification used for enlarging the screen to the magnification "$\alpha^m$" ($\alpha$>1) larger than the magnification used in the screen enlargement processing (S210) immediately preceding (S209), and performs enlarge display (zoom-in) at the updated first magnification "$\alpha^m$" of the image editing screen 300, including the object being selected by the pointer 310, such that for example the pointer 310 is positioned at the center of the image editing screen 300 (S211).

Further, in the judgment of S206, when the unit movement amount of the pointer 310 is greater than the threshold value (here, 0), that is, when the pointer 310 selecting the object has moved during the time until the unit time (dt) elapses (when the judgment of S206 is No), the zoom control unit 170 further judges whether the judgment result in the immediately preceding S206 and the judgment result in the current S206 are the same, that is, whether both the unit movement amount determined immediately before and the newly determined unit movement amount are greater than the threshold value (whether they are 0 or not) (S212).

When this judgment is No, the zoom control unit 170 sets (initializes) the value of the prescribed coefficient "n" to 1 (S213), sets (updates) the second magnification used for reducing the screen to "$\beta^n$" (1>$\beta$>0) (S214), and performs reduced display (zoom-out) at the updated second magnification "$\beta$" of the image editing screen 300 including the object being selected by the pointer 310 such that, for example, the pointer 310 is positioned in the center of the image editing screen 300 (S215). β may for example be set to a numerical value between 0.5 and 1.0.

On the other hand, when this judgment is Yes, the zoom control unit 170 increments the value of the prescribed coefficient "n" by 1 (S216), sets (updates) the second magnification used for reducing the screen to the magnification "$\beta^n$" (1>$\beta$>0) smaller than the magnification used in the immediately preceding (S215) reduction processing (S214), and performs reduced display (zoom-out) at the updated second magnification "$\beta^n$" of the image editing screen 300 including the object being selected by the pointer 310 such that, for example, the pointer 310 is positioned in the center, of the image editing screen 300 (S215).

By repeating each of the above steps (S201 to S216), the zoom processing unit 140 of the zoom processing device 100 repeatedly performs enlarged display or reduced display of the image editing screen 300 according to operations of the mouse 110 by the user.

In this way, by means of the zoom processing device 100 of the first exemplary embodiment, zooming (enlargement or reduction) of the screen including an object can be performed merely by dragging the object using the mouse 100. Further, by suppressing the movement amount of the pointer 310 which is selecting the object to be equal to or less than a threshold value throughout a continuous unit time (dt) (in the above example, by continuing stoppage), the enlargement magnification of the screen is made larger (the screen is enlarged in an accelerated manner), and conversely, by making the movement amount of the pointer 310 which is selecting the object larger than a threshold value throughout a continuous unit time (dt) (in the above example, by continuous movement), the reduction magnification of the screen is made smaller (the screen is reduced in an accelerated manner), so that a desire of the user to enlarge or reduce the screen can be accommodated promptly.

In the above, an exemplary embodiment of the invention was described; but this invention is not limited to the above exemplary embodiment, and can be applied with various modifications.

As a difference with the first exemplary embodiment, the zoom processing device 100 can be communicably connected with a user terminal 500 via a communication circuit 540 (for example, the Internet or similar), as a so-called application server. For example, the zoom processing device 100 can function as a server which distributes map information.

Further, the user terminal 500 is equipped with constituent elements comprised by personal computers in general, such as a mouse 510 and display 520; and a CPU, by reading an Internet browser program from a HDD or other storage device into RAM and executing the program, has the functions of an Internet browser 530. Map information transmitted by the zoom processing device 100 is interpreted by the Internet browser 530 and is displayed on the display 520. In this case, for example the entire background (map) of the screen displayed on the display 520 is an object.

In this example, the details of zoom processing performed by the zoom processing device 100 are basically the same as in the case of the first exemplary embodiment (FIG. 2), but differ from the first exemplary embodiment in that the data necessary for processing and processing results are transmitted and received with the user terminal 500 over the communication circuit 540.

More specifically, when the user operating the user terminal 500 operates the mouse 510 and drags a map displayed on the display 520, information relating to this mouse operation is transmitted to the zoom processing device 100. The zoom processing device 100 performs zooming (enlargement or reduction) of the map information (information of the map displayed on the display 520) based on information received from the user terminal 500, and transmits the zoomed map information to the user terminal 500. By this means, the zoomed map is displayed on the display 520 connected to the user terminal 520.

Figure 6:
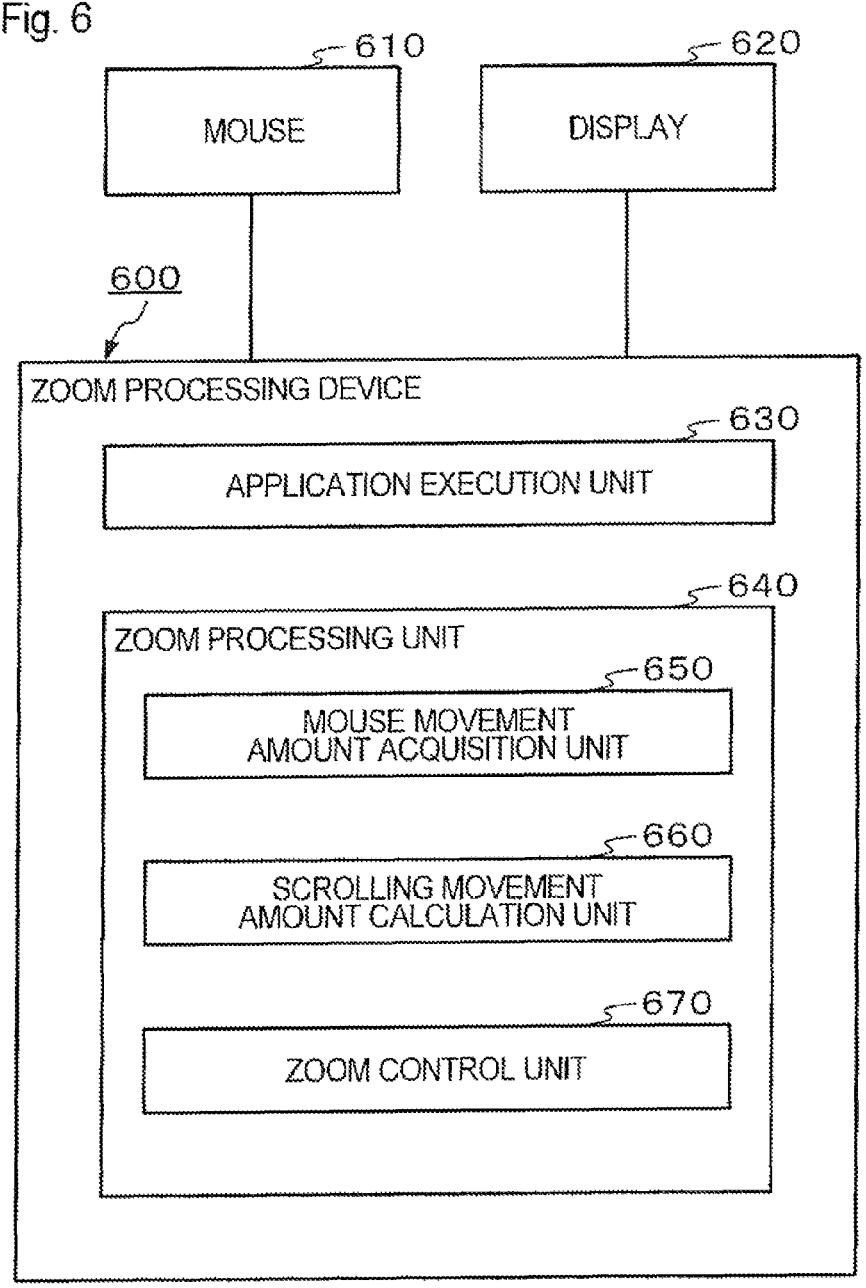
FIG. 6 shows another configuration of a zoom processing device.

Further, for example in the first exemplary embodiment, zooming the screen based on the movement amount of a scrollbar displayed on the screen can be taken to be zooming the screen based on the movement amount of the screen which scrolls according to the scrollbar operation. According to this point of view, an object of the invention can be attained even by a zoom processing device 600 configured as shown in FIG. 6. The communicable connection of the mouse 610, display 620, and other constituent elements, and the provision of the functions of the application execution unit 630, are similar to the zoom processing device 100 of the first exemplary embodiment.

Differences between the zoom processing device 600 and the zoom processing device 100 of the first exemplary embodiment are the provision of scrolling amount calculation unit 660 for calculating the scrolling amount of the screen displayed on the display 620 based on information acquired from the mouse 610 by the mouse movement amount acquisition unit 650, and that the zoom control unit 670 performs enlarged display of the screen at a third magnification when the scrolling amount is equal to or less than a threshold value, and performs reduced display of the screen at a fourth magnification when the scrolling amount is greater than a threshold value. Setting and updating of magnifications can be performed by a method similar to that explained in the first exemplary embodiment.

By means of this configuration, when a scrollbar operation is performed by an operation on the mouse 610, and when an operation is performed on screen scrolling unit (for example, a scroll wheel or similar) provided in the mouse 610, the screen can be zoomed based on the screen scrolling amount in for example unit time.

Further, for example the first magnification and second magnification may be set based on the magnitude of the unit movement amount (|T−S|) of the pointer 310, determined in S205 of FIG. 2. In this case, the first magnification is set to for example "α·(1+|T−S|)" (α>1), and the second magnification may for example be set to "β·(1+|T−S|) (1>β>0).

Further, for example in the first exemplary embodiment, the judgment of whether the pointer 310, in the state of having selected an object, is stopped in a unit time (dt) (S206 in FIG. 2), is performed based on the unit movement amount (|T−S|) of the pointer 310 calculated in S205; but judgment may be performed based simply on whether information acquired from the mouse 110 has changed in the unit time (dt). In this case, when the same information continues to be acquired from the mouse 110 throughout the unit time (dt) (or, in a case in which the mouse 110 is not moving, a case in which no information is acquired is also possible), it can be judged that the pointer 310 is stopped.

The related art described in the background art causes a problem, such as, in the technology of Patent Reference 1, in order to perform scroll processing and zoom processing, a complicated three-stage operation must be performed in which a scrolling or zoom mode is activated, and after defining a scrolling or zooming direction, scrolling or zooming is executed.

An exemplary advantage according to the present invention is, in a state in which an object displayed on a screen is selected by a pointer, merely by moving or stopping the pointer, the screen can be zoomed based on the movement amount of the pointer. Or, merely by scrolling the screen, the screen can be zoomed based on the screen scrolling amount.

The whole or part of the exemplary embodiments disclosed above can be described as, but not limited to, the following supplementary notes.

(Supplementary Note 1)

A zoom processing device, including:

a pointer movement amount calculation unit for calculating a movement amount of a pointer which is selecting an object on a screen; and a zoom control unit for performing enlarged display of a screen including the object at a first magnification when, as a result of the calculation, the movement amount of the pointer is equal to or less than a threshold value, and for performing reduced display of a screen including the object at a second magnification when, as a result of the calculation, the movement amount of the pointer is greater than a threshold value.

(Supplementary Note 2)

The zoom processing device according to Supplementary note 1, wherein the pointer movement amount calculation unit calculates the movement amount of the pointer in a unit time, and when movement amounts of the pointer in a unit time calculated at the calculation time and at an immediately preceding calculation time are equal to or less than a threshold value, the zoom control unit updates the first magnification to a larger magnification, and performs enlarged display of the screen including the object at the updated first magnification, and when movement amounts of the pointer in a unit time calculated at the calculation time and at an immediately preceding calculation time are greater than a threshold value, the zoom control unit updates the second magnification to a smaller magnification, and performs reduced display of the screen including the object at the updated second magnification.

(Supplementary Note 3)

A zoom processing device, including:

a scrolling amount calculation unit for calculating a screen scrolling amount; and a zoom control unit for performing enlarged display of the screen at a third magnification when, as a result of the calculation, the scrolling amount is equal to or less than a threshold value, and for performing reduced display of the screen at a fourth magnification when, as a result of the calculation, the scrolling amount is greater than a threshold value.

(Supplementary Note 4)

A zoom processing method, including:

calculating a movement amount of a pointer which is selecting an object on a screen; and performing enlarged display of a screen including the object at a first magnification when, as a result of the calculation, the movement amount of the pointer is equal to or less than a threshold value, and performing reduced display of a screen including the object at a second magnification when, as a result of the calculation, the movement amount of the pointer is greater than a threshold value.

(Supplementary Note 5)

A computer program causing an information processing device to execute the zoom processing method according to Supplementary note 4.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A zoom processing device, comprising:

a pointer movement amount calculation unit for calculating a movement amount of a pointer which is selecting an object on a screen; and a zoom control unit for performing enlarged display of a screen including the object at a first magnification when, as a result of the calculation, the movement amount of the pointer is equal to or less than a threshold value, and for performing reduced display of a screen including the object at a second magnification when, as a result of the calculation, the movement amount of the pointer is greater than a threshold value, wherein the pointer movement amount calculation unit calculates the movement amount of the pointer in a unit time, and when movement amounts of the pointer in a unit time calculated at the calculation time and at an immediately preceding calculation time are equal to or less than a threshold value, the zoom control unit updates the first magnification to a larger magnification, and performs enlarged display of the screen including the object at the updated first magnification, and when movement amounts of the pointer in a unit time calculated at the calculation time and at an immediately preceding calculation time are greater than a threshold value, the zoom control unit updates the second magnification to a smaller magnification, and performs reduced display of the screen including the object at the updated second magnification.

2. A zoom processing method, comprising:
calculating, by a computing device, a movement amount of a pointer which is selecting an object on a screen; and
performing, by the computing device, enlarged display of a screen including the object at a first magnification when, as a result of the calculation, the movement amount of the pointer is equal to or less than a threshold value, and performing reduced display of a screen including the object at a second magnification when, as a result of the calculation, the movement amount of the pointer is greater than a threshold value,
wherein the movement amount of the pointer is calculated in a unit time, and
when movement amounts of the pointer in a unit time calculated at the calculation time and at an immediately preceding calculation time are equal to or less than a threshold value, the first magnification updated to a larger magnification, and enlarged display of the screen including the object is performed at the updated first magnification, and when movement amounts of the pointer in a unit time calculated at the calculation time and at an immediately preceding calculation time are greater than a threshold value, the second magnification is updated to a smaller magnification, and reduced display of the screen including the object is performed at the updated second magnification.

3. A non-transitory computer-readable data storage medium storing a computer program causing an information processing device to execute the zoom processing method according to claim 2.

4. A zoom processing device, comprising:
pointer movement amount calculation means for calculating a movement amount of a pointer which is selecting an object on a screen; and
zoom control means for performing enlarged display of a screen including the object at a first magnification when, as a result of the calculation, the movement amount of the pointer is equal to or less than a threshold value, and for performing reduced display of a screen including the object at a second magnification when, as a result of the calculation, the movement amount of the pointer is greater than a threshold value,
wherein the movement amount of the pointer is calculated in a unit time, and
when movement amounts of the pointer in a unit time calculated at the calculation time and at an immediately preceding calculation time are equal to or less than a threshold value, the first magnification updated to a larger magnification, and enlarged display of the screen including the object is performed at the updated first magnification, and when movement amounts of the pointer in a unit time calculated at the calculation time and at an immediately preceding calculation time are greater than a threshold value, the second magnification is updated to a smaller magnification, and reduced display of the screen including the object is performed at the updated second magnification.

* * * * *